US006207287B1

(12) United States Patent
Alba et al.

(10) Patent No.: US 6,207,287 B1
(45) Date of Patent: *Mar. 27, 2001

(54) COATED DUMMY PLATES

(75) Inventors: Cornelia Alba, Ingelheim; Andreas Elsässer, Idstein; Fritz-Feo Grabley, Kelkheim; Klaus Jörg, Ingelheim; Peter Lehmann, Kelkheim, all of (DE)

(73) Assignee: AGFA-Gevaert, Mortsel (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,422

(22) Filed: Jul. 30, 1998

(30) Foreign Application Priority Data

Jul. 30, 1997 (EP) .................................... 97202383

(51) Int. Cl.$^7$ .............................. B32B 15/04; B05D 3/00; B41N 1/00

(52) U.S. Cl. .......................... 428/469; 428/336; 428/457; 428/472.2; 428/913; 427/156; 427/327; 427/379; 427/384; 427/402

(58) Field of Search .................................... 428/469, 457, 428/459, 461, 472.2, 336, 500, 913; 427/156, 327, 379, 384, 402

(56) References Cited

U.S. PATENT DOCUMENTS

| | | | | |
|---|---|---|---|---|
| 5,474,885 | * | 12/1995 | Michiels et al. | 430/539 |
| 5,481,084 | | 1/1996 | Patrick et al. | 219/123 |
| 5,786,127 | * | 7/1998 | Madoux et al. | 430/273.1 |
| 5,908,706 | * | 6/1999 | Lehmann et al. | 428/469 |

FOREIGN PATENT DOCUMENTS

| | | |
|---|---|---|
| 110 417 | 6/1984 | (EP) . |
| 316 240 | 5/1989 | (EP) . |
| 497 351 | 8/1992 | (EP) . |
| 619 525 | 10/1994 | (EP) . |

* cited by examiner

*Primary Examiner*—Marie Yamnitzky
(74) *Attorney, Agent, or Firm*—Foley & Lardner

(57) ABSTRACT

A dummy plate is provided for offset printing which essentially consists of a plate-, sheet- or band-form, mechanically and/or electro-chemically roughened, anodically oxidized and optionally hydrophilized aluminium support and a non-photosensitive, water-soluble protective layer applied thereto, characterized in that the layer contains a water-soluble organic compound which contains at least one OH- or NH-acidic group having a pKa value of $\leqq 8$ as acid or salt, and has a layer thickness which is smaller than the average roughness ra of the support material, determined by optical means. Even after extended storage at elevated temperature, the dummy plate can easily be used without an additional development step and exhibits no tendency to stick.

15 Claims, No Drawings

COATED DUMMY PLATES

TECHNICAL AREA OF THE INVENTION

The invention relates to a dummy plate for offset printing which essentially consists of a mechanically and/or electro-chemically roughened anodically oxidized and aluminium support and a non-photosensitive, water-soluble layer applied thereto, and to a process for the production thereof.

PRIOR ART

In a printing machine, a plurality of plates are generally clamped alongside one another and in succession on a printing cylinder. Dummy plates are planographic printing plates without ink-carrying areas. They are used where the paper band is not to be printed completely. A dummy plate has the task of transferring damping solution applied over the entire width of the cylinder to the paper band. At the same time, the dummy plate must not take up the printing ink, so that this is not transferred to the paper ("smearing"). A particularly large number of dummy plates are necessary if, in multicolour offset printing, individual colours are not needed on all pages and the respective inking systems are then not supposed to transfer ink.

Dummy plates are usually roughened and anodically oxidized aluminium plates. If desired, they can also be subjected to hydrophilizing treatment, for example with phosphorus-containing compounds, as described in DE 4423140. The disadvantage of these dummy plates is that they react very sensitively to fingerprints and other external influences. Fingerprints result, for example, in ink take-up and thus smearing in the printing machine. In addition, it is found that the hydrophilicity of such dummy plates worsens with time, and they therefore take up ink in the printing machine and cause smearing. This effect is particularly pronounced if the dummy plates have been exposed to the room air without protection for an extended period and have taken up, for example, moisture, dust or traces of oil. In order to eliminate the consequences of fingerprints and to restore the hydrophilicity of the aluminium surface to the original value, dummy plates are subjected to the normal development process with subsequent gumming. The development cleans and hydrophilizes the surface of the printing plate. Subsequent gumming protects the surface. The dummy plates treated in this way have a significantly lower tendency towards smearing in the printing machine.

EP 96200429 describes dummy plates which do not require a development step before use in the printing machine. These dummy plates consist of an aluminium support of the abovementioned type which has a non-photosensitive, water-soluble protective layer of a water-soluble polymer and an acidic inorganic substance. Preference is given to mixtures of polyvinyl alcohol and inorganic phosphates/sulphates. However, it is found that these materials lose their ink-repellent action after extended storage at elevated temperature—which can be simulated by a forced storage test for 24 hours at 100° C.—and likewise result in smearing during printing. It has furthermore been found that the protective layers become tacky under moist storage conditions.

OBJECT OF THE INVENTION

The object of the invention is therefore to provide a dummy plate in which, even after extended storage at elevated temperature, a development step is not absolutely necessary in order to ensure a sufficiently ink-repellent action during printing and which does not develop a tendency to stick during storage at high atmospheric humidity levels. In addition, it should be processable without problems in an automatic development unit with developer and subsequent gumming. This additional requirement therefore means that, in automatic printing-plate processing units, all plates, including the dummy plates, are subjected to the normal development conditions.

BRIEF DESCRIPTION OF THE INVENTION

The object is achieved by a dummy plate for offset printing which essentially consists of a plate-, sheet- or band-form, mechanically and/or electro-chemically roughened, anodically oxidized and optionally hydrophilized aluminium support and a non-photosensitive, water-soluble layer applied thereto. The layer is characterized in that it has a water-soluble organic compound which contains at least one OH- or NH-acidic group having a pKa value of ≦8 as acid or salt, and has a layer thickness which is smaller than the average roughness ra of the support material, determined by optical means.

DETAILED DESCRIPTION OF THE INVENTION

The organic compound preferably contains at least 3 acidic groups, particularly preference being given to phosphonic acid and/or sulphonic acid units. This compound can be a defined organic compound or a mixture and/or polymer thereof. In the case of a salt, the counterions are preferably monovalent cations, in particular sodium, potassium or ammonium, the proportion of acidic groups in the form of a salt or free acid also depending, besides on the pKa value, on the pH of the coatings, which is preferably set to 2–8. The salt formation can also take place intra-molecularly. The proportion of these organic compounds in the protective layers is at least 5%, preferably >10%, particularly preferably >20%.

The layer can furthermore contain, in particular, a water-soluble polymeric film former. Examples thereof are polyvinyl alcohols, polyamides, such as polyvinylpyrrolidone, starch derivatives, such as gum arabic, etc. The proportion of these film formers is between 0 and 80%. In the case of the use of polymeric organic compounds containing acidic units which have film-forming properties, for example sulphonated polystyrene, the addition of such film formers is not absolutely necessary.

The protective layer preferably also contains a sequestering agent. In particular, sequestering agents are used whose structure corresponds to the above-described organic compounds containing acidic units. Examples which may be mentioned are aminocarboxylic acids and aminophosphonic acids. The proportion of these additives is between 0 and 20%, preferably between 5 and 15%.

The protective layers preferably contain a biocide as preservative. Examples which may be mentioned are derivatives of 4-isothiazolin-3-one, such as 2-methyl-4,5-trimethylene-, 5-chloro-2-methyl- and 2-methyl-4-isothiazolin-3-one, furthermore 2-bromo-2-nitro-1,3-propanediol or chloroacetamide. The proportion of these additives is between 0 and 2%, preferably between 0.01 and 1%.

Something which is not necessary for the function as a dummy plate, but is advantageous in manufacturing the material, is the addition of surfactants and dyes. Surfactants improve the coating behaviour. Dye additives simplify inspection of the finished material. The amounts added are generally less than 5%.

In the production of the novel dummy plates, a dilute aqueous solution containing said constituents is generally applied to the roughened and optionally hydrophilized aluminium support. The proportion of non-volatile constituents in this coating solution varies depending on the coating method; in the case of flow coating, solids contents of between 0.05 and 5% give good results.

The thickness of the water-soluble protective layer after drying is less than the average roughness ra of the support material, determined by optical means. At higher layer thicknesses, a tendency to stick when stored under moist conditions is evident in these coatings. In the case of support materials having roughness values ra of between 0.5 and 1.5 μm, films having densities of ≧1 g/ml give the best results at layer weights of from 0.15 to 0.5 g/m$^2$.

The aluminium plates, sheets or bands from which the novel dummy plates are produced consist of aluminium or an alloy thereof. They are mechanically and/or electrochemically roughened. The roughening is preferably carried out electrochemically in dilute hydrochloric acid or nitric acid. During the subsequent anodic oxidation, preferably in dilute sulphuric acid, an oxide layer forms on the aluminium. The oxidation is preferably controlled in such a way that the oxide layer has a weight of from 1 to 5 g/m$^2$.

The aluminium material prepared in this way is then subjected, if desired, to hydrophilizing treatment. The hydrophilization is preferably carried out using phosphorus-containing compounds. Particular preference is given here to organic polymers containing phosphorus-containing groups, in particular phosphinic acid or phosphonic acid groups. Polymers of this type are described, for example, in EP-A 069 320 and EP-A 069 318. Particular preference is given to polyvinylphosphonic acid, also in the form of a combination post-treatment, as described in DE 4423140. The hydrophilization is generally carried out within a few seconds using aqueous solution at elevated temperature.

The novel dummy plate does not have to be subjected to the development process, even after extended storage at elevated temperature, but instead can, after edging, be clamped directly onto the printing cylinder of the printing machine. The water-soluble layer is removed by the damping solution, producing the ink-repellent action.

During application of the protective layer, coating faults can occur which cause undesired smearing during printing. Such faults can be avoided by applying the aqueous coating solution to the aluminium support material in at least two applications and drying each coat, so that the coating faults occurring during the preceding application are compensated. Preferably, an aqueous coating solution is applied twice and dried each time. Uncoated areas which later result in smearing are reliably avoided in this way.

EXAMPLES

The examples below describe embodiments of the invention. Comparative examples are denoted by an *.

The density of the films is in all cases >1 g/ml.

Example 1

An aluminium band which has been roughened electrochemically in hydrochloric acid (ra value 1.25 μm, determined using an optical microprobe having a measurement spot radius of 1 μm) and anodized in sulphuric acid (oxide layer weight: 3 g/m$^2$) and hydrophilized using a 0.2% aqueous polyvinylphosphonic acid solution at 60° C. in 10 seconds is coated with in each case 1% aqueous solutions of the following composition by means of a double application using a flow coater at a rate of 0.35 g/m$^2$:

1-1*:

80% by weight of polyvinyl alcohol having a degree of hydrolysis of 75–79 mol % and a degree of polymerization $P_n$ of 300

4% by weight $C_{12}$–$C_{14}$-fatty acid ethoxylate containing 20 EO units

16% by weight of 85% phosphoric acid 1-2*:

as for 1-1, but

16% by weight of ammonium dihydrogenphosphate ($NH_4H_2PO_4$) instead of the phosphoric acid 1-3:

40% by weight of the disodium salt of dodecyldiphenyl ether disulphonic acid (surfactant)

25% by weight of the sodium salt of benzene-1,3-disulphonic acid, 9.8% by weight of citric acid monohydrate (sequestering agent), 25% by weight of the sodium salt of polystyrene-sulphonic acid 0.2% by weight of chloroacetamide as biocide.

The pH is adjusted to 7 using NaOH 1-4:

40% by weight of polyvinyl alcohol having a degree of hydrolysis of 75–79 mol % and a degree of polymerization $P_n$ of 300

25% by weight of the sodium salt of benzene-1,3-disulphonic acid, 9.8% by weight of citric acid monohydrate (sequestering agent)

25% by weight of the sodium salt of polystyrene-sulphonic acid, 0.2% by weight of chloroacetamide as biocide.

The pH is adjusted to 6 using NaOH.

1-5:

40% by weight of dextrin,

25% by weight of the sodium salt of benzene-1,3-disulphonic acid, 9.8% by weight of the trisodium salt of aminotrismethylenephosphonic acid (sequestering agent)

25% by weight of the sodium salt of polystyrene-sulphonic acid 0.2% by weight of 2-methyl-4,5-trimethylene-4-isothiazolin-3-one as biocide.

The pH is adjusted to 5 using NaOH.

1-6:

70% by weight of dextrin, 19.8% by weight of the trisodium salt of aminotrismethylenephosphonic acid (sequestering agent)

10% by weight of polyvinylphosphonic acid 0.2% by weight of 2-bromo-2-nitro-1,3-propanediol as biocide.

The pH is adjusted to 5 using NaOH.

The sulphonic and phosphonic acids used in Examples 1–3 to 1–6 have pKa values of ≦8.

1-7*:

Comparative plate without a protective layer

Plates 1-1 to 1-7 are stored a) for 20 hours at room temperature, b) for 20 hours at 100° C. and an atmospheric humidity of <20% r.h and c) for 20 hours at 40° C. and an atmospheric humidity of approximately 80% r.h.

The plates were then proofed in a Roland-Favorit II printing machine with Dahlgreen damping system and it is checked whether the dummy plates run freely with less than 50 sheets (+=free after less than 50 sheets,−=smearing even after 50 sheets).

The results are shown in Table 1.

TABLE 1

| Example | Storage a) | Storage b) | Storage c) |
|---|---|---|---|
| 1-1* | + | − | + |
| 1-2* | + | − | + |
| 1-3 | + | + | + |
| 1-4 | + | + | + |
| 1-5 | + | + | + |
| 1-6 | + | + | + |
| 1-7* | − | − | − |

In addition, dummy plate samples 1-3 to 1-6 are developed in a development unit at 24° C. and a processing rate of 1.0 m/min in the following negative developers:

| | |
|---|---|
| 2.0 | parts by weight of sodium phenylsulphonate |
| 1.4 | parts by weight of NaOH |
| 1.5 | parts by weight of Graham salt |
| 4.0 | parts by weight of pelargonic acid |
| 3.0 | parts by weight of polyvinylmethylacetamide |
| 4.0 | parts by weight of benzyl alcohol |
| 0.5 | part by weight of potassium borate |
| rest to | 100 parts by weight of demineralized water. |

The results of the subsequent proofing test as described above are shown in Table 2:

TABLE 2

| Example | Storage a) | Storage b) | Storage c) |
|---|---|---|---|
| 1-3 | + | + | + |
| 1-4 | + | + | + |
| 1-5 | + | + | + |
| 1-6 | + | + | + |

Example 2

An aluminium band which has been electro-chemically roughened in nitric acid (ra value 0.95 μm, determined using an optical microprobe having a measurement spot radius of 1 μm) and anodized in sulphuric acid (oxide layer weight: 2 g $m^2$) and hydrophilized firstly using a 0.1% aqueous solution of phosphonomethylated polyethylenimine and subsequently with a 0.2% aqueous polyvinylphosphonic acid solution, in each case at 60° C. for 10 seconds, is coated with in each case 0.8% aqueous solutions of the following composition by means of a double application using a flow coater at a rate of 0.40 g/$m^2$:

2-1:

40% by weight of polyvinyl alcohol having a degree of hydrolysis of 75–79 mol % and a degree of polymerization $P_n$ of 300

40% by weight of dextrin

4% by weight of $C_{12}$–$C_{14}$-fatty acid ethoxylate containing 20 EO units

16% by weight of 85% phosphoric acid 2-2*:

as for 2-1, but

16% by weight of ammonium dihydrogenphosphate ($NH_4H_2PO_4$) instead of the phosphoric acid 2-3:

20% by weight of the sodium salt of dioctyl-sulphosuccinate (surfactant)

25% by weight of the sodium salt of benzene-1,3-disulphonic acid, 4.8% by weight of the trisodium salt of N,N-bis-carboxymethyl-β-alanine (sequestering agent)

49% by weight of the sodium salt of polystyrene-sulphonic acid 1.0% by weight of Acid Red 52, C.I. 45100

0.2% by weight of chloroacetamide as biocide

The pH is adjusted to 7 using NaOH.

2-4:

40% by weight of polyvinyl alcohol having a degree of hydrolysis of 75–79 mol % and a degree of polymerization $P_n$ of 300

20% by weight of dextrin

10% by weight of the sodium salt of phenylphosphonic acid 4.8% by weight of the trisodium salt of N,N-bis-carboxymethyl-β-alanine (sequestering agent)

24% by weight of the sodium salt of polystyrene-sulphonic acid 1.0% by weight of Acid Red 52, C.I. 45100

0.2% by weight of chloroacetamide as biocide

The pH is adjusted to 6 using NaOH.

2-5:

40% by weight of dextrin,

25% by weight of the sodium salt of phenylphosphonic acid, 9.8% by weight of the trisodium salt of aminotris-methylenecarboxylic acid (sequestering agent)

24% by weight of the sodium salt of N-phosphono-methyl-polyethylenimine 0.2% by weight of 2-methyl-4,5-trimethylene-4-iso-thiazolin-3-one as biocide.

1.0 % by weight of Acid Red 52, C.I. 45100

The pH is adjusted to 5 using NaOH.

2-6:

69% by weight of dextrin, 19.8% by weight of the trisodium salt of aminotris-methylenephosphonic acid (sequestering agent)

10% by weight polyvinylmethylphosphinic acid 0.2% by weight of 2-bromo-2-nitro-1,3-propanediol as biocide.

1.0% by weight of Acid Red 52, C.I. 45100

The pH is adjusted to 5 using NaOH.

The sulphonic/phosphonic/phosphinic acids used in Examples 2–3 to 2–6 have pKa values of ≧8.

2-7*:

Comparative plate without a protective layer

Plates 2-1 to 2-7 are stored a) for 20 hours at room temperature, b) for 20 hours at 100° C. and an atmospheric humidity of <20% and c) for 20 hours at 40° C. and an atmospheric humidity of about 80%.

The plates were subsequently proofed in a Roland-Favorit II printing machine with Dahlgreen damping system and examined and set as in Example 1.

The results are shown in Table 3.

TABLE 3

| Example | Storage a) | Storage b) | Storage c) |
|---|---|---|---|
| 2-1* | + | − | + |
| 2-2* | + | − | + |
| 2-3 | + | + | + |
| 2-4 | + | + | + |
| 2-5 | + | + | + |
| 2-6 | + | + | + |
| 2-7* | − | − | − |

In addition, dummy plate samples 2–3 to 2–6 are developed in a development unit at 24° C. and a processing rate of 1.0 m/min in the following negative developer:

| | |
|---|---|
| 1.0 | part by weight of sodium cumenesulphonate |
| 2.8 | parts by weight of 1-amino-2-propanol |
| 1.5 | parts by weight of trisodium citrate |
| 1.0 | part by weight of $Na_2SiO_3$ |
| 2.0 | parts by weight of $C_{12}$–$C_{14}$-fatty acid ethoxylate containing 15 EO units |
| remainder | to 100 parts by weight of demineralized water. |

The results of the subsequent proofing test as described above are shown in Table 4:

TABLE 4

| Example | Storage a) | Storage b) | Storage c) |
|---|---|---|---|
| 2-3 | + | + | + |
| 2-4 | + | + | + |
| 2-5 | + | + | + |
| 2-6 | + | + | + |

Example 3

An aluminium band is roughened (ra value 0.8 μm) using a 40% aqueous slurry of aluminosilicate having an average particle size of 40 μm, anodized in sulphuric acid (oxide layer weight: 1.8 g/m$^2$) and hydrophilized using a 0.2% aqueous polyvinylphosphonic acid solution at 60° C. for 10 seconds.

The subsequent protective layer is applied in various thicknesses (see Table 5) as a 0.8% aqueous solution:

| | |
|---|---|
| 70% by weight | of dextrin, |
| 18.8% by weight | of the trisodium salt of aminotris-methylenephosphonic acid (seguestering agent) |
| 10% by weight | of polyvinylphosphonic acid |
| 1.0% by weight | of Acid Red 52, C.I. 45100 |
| 0.2% by weight | of 2-bromo-2-nitro-1,3-propanediol (biocide) |

The pH is adjusted to 4.5 using NaOH.

The finished plates are stored as described in Example 1, and the plates stored as in c) are firstly investigated for tendency to stick. (Table 5: +=no evident tendency to stick, −=sticking of the plate samples).

TABLE 5

| Example | Layer thickness (μm) | Adhesion test |
|---|---|---|
| 3-1 | 0.2 | + |
| 3-2 | 0.4 | + |
| 3-3* | 1.2 | − |

A proofing test is then carried out as described above. The results are shown in Table 6:

TABLE 6

| Example | Storage a) | Storage b) | Storage c) |
|---|---|---|---|
| 3-1 | + | + | + |
| 3-2 | + | + | + |
| 3-3* | + | + | − x) |

x)=smearing tendency in the areas where the protective layer has been damaged by adhesion.

We claim:

1. Dummy plate for offset printing comprising a plate-, sheet- or band-form, mechanically and/or electrochemically roughened, anodically oxidized and optionally hydrophilized aluminum support and a non-photosensitive, water-soluble protective layer applied thereto, wherein the layer contains a water-soluble organic compound which contains at least one OH- or NH-acidic group having a pKa value of ≦8 as acid or salt, and has a layer thickness which is smaller than the average roughness ra of the aluminum support.

2. Dummy plate according to claim 1, wherein the pH of the protective layer is 2–8.

3. Dummy plate according to claim 1, wherein the ra value of the aluminum support is between 0.5 and 1.5 μm.

4. Dummy plate according to claim 1, wherein the anodization is followed by hydrophilizing treatment with an organic polymer containing phosphorus-containing groups.

5. Dummy plate according to claim 1, wherein the organic compound contains at least 3 acidic groups.

6. Dummy plate according to claim 1, wherein the acidic group is a phosphonic or sulphonic acid unit.

7. Dummy plate according to claim 1, wherein the content of organic compound is at least 5%.

8. Dummy plate according to claim 7, wherein the content of organic compound is at least 10%.

9. Dummy plate according to claim 8, wherein the content of organic compound is at least 20%.

10. Dummy plate according to claim 1, wherein the protective layer contains a biocide.

11. Dummy plate according to claim 1, wherein the protective layer contains a sequestering agent.

12. Dummy plate according to claim 1, wherein the protective layer additionally contains a polymeric, water-soluble film former.

13. A process for producing the dummy plate of claim 1, comprising applying a coating solution at least twice and drying each coat.

14. A process according to claim 13, comprising applying the coating solution twice.

15. Dummy plate for offset printing consisting of a plate-, sheet- or band-form, mechanically and/or electrochemically roughened, anodically oxidized and optionally hydrophilized aluminum support and a non-photosensitive, water-soluble protective layer applied thereto, wherein the layer contains a water-soluble organic compound which contains at least one OH- or NH-acidic group having a pKa value of ≦8 as acid or salt, and has a layer thickness which is smaller than the average roughness ra of the aluminum support.

* * * * *